United States Patent [19]

Bevan

[11] E Re. 28,549

[45] Reissued Sept. 16, 1975

[54] INVISIBLE DRIVE UNIT FOR LARGE DISPLAY SIGNS

[75] Inventor: James W. Bevan, Salt Lake City, Utah

[73] Assignee: Specialty Engineering & Manufacturing Co., Salt Lake City, Utah

[22] Filed: Sept. 9, 1970

[21] Appl. No.: 70,944

Related U.S. Patent Documents

Reissue of:

[64] Patent No.: 3,427,738
Issued: Feb. 18, 1969
Appl. No.: 614,431
Filed: Feb. 7, 1967

U.S. Applications:

[63] Continuation of Ser. No. 871,807, Oct. 29, 1969, abandoned.

[52] U.S. Cl. ..... 40/33; 40/77; 40/130 R

[51] Int. Cl. ..... G09f 11/10; G09f 13/00

[58] Field of Search ..... 40/33, 77, 130 R; 310/73, 310/80, 83, 157; 74/206

[56] References Cited

UNITED STATES PATENTS

| | | | |
|---|---|---|---|
| 2,209,858 | 7/1940 | Steiert | 40/33 X |
| 2,941,322 | 6/1960 | Harmon | 40/33 |
| 2,972,202 | 2/1961 | Milks | 40/33 |
| 3,281,973 | 11/1966 | Glaser | 40/33 |
| 3,325,931 | 6/1967 | Leuthesser | 40/33 |

*Primary Examiner*—Wm. H. Grieb
*Attorney, Agent, or Firm*—George H. Mortimer

[57] ABSTRACT

Drive mechanism for a translucent movable or rotatable sign, readable from either face and illuminated by a set of lighting elements arranged in central plane midway between its major faces, is substantially in such plane and arranged in a slender column, located between a pair of adjacent lighting elements in a manner that no externally visible shadow is cast.

6 Claims, 6 Drawing Figures

INVENTOR

JAMES W. BEVAN

BY Edwin M. Thomas

ATTORNEY

INVISIBLE DRIVE UNIT FOR LARGE DISPLAY SIGNS

Matter enclosed in heavy brackets [ ] appears in the original patent but forms no part of this reissue specification; matter printed in italics indicates the additions made by reissue.

---

*This application is a continuation of application Ser. No. 871,807, filed Oct. 29, 1969, and now abandonded*

BACKGROUND

In recent years there has been an increasing demand and use for large mobile display signs. Such signs are widely used at automobile service stations, shopping centers, stores, banks, and in other businesses. The signs are made movable, so as to attract attention, but they must be attractive in style. They are often quite large in size, and are commonly visible and readable day or night at a considerable distance.

Signs of the kind mentioned above are often mounted on a vertical supporting shaft or pole which may be fixed or rotatable. If the pole itself rotates it is driven by a motor and gear mechanism located at or near its base. Such a sign in the larger sizes requires a rather bulky and unsightly base mechanism to support as well as to drive a rotatable pole of sufficient height, strength and rigidity for the purpose. Other signs sometimes are mounted on a fixed pole provided with a rotatable support and drive means at the top. This requires that the drive mechanism be mounted high up in the air. In either case the drive mechanism usually includes a rotatable shaft or equivalent, either extending up from the base on which the pole is mounted, and therefor requiring a rotatable shaft inside the pole, or including a complete drive mechanism at the top of the pole. In the latter case the whole unit, conventionally, must be housed in a box or housing or protuberance beneath the rotatable exhibit part of the sign. This housing is often an unwieldly and unsightly structure. In some cases where the drive mechanism has been designed to rotate with the sign it has usually been located just below and external of the sign proper.

While it has been known to locate the drive unit inside the sign itself, in the case of opaque sign structures, it has usually not been considered feasible to mount a drive unit within a translucent sign of large size. Such signs are commonly large in area and require sturdy mountings and drive means. Because of their size, the force of winds, etc. against them, internal drive mechanisms have not been favored for translucent signs. Usually a competent drive mechanism inside a large and relatively thin reversible or rotatable sign is not practical. It requires either making the sign frame or structure excessively large or mounting an adequate drive unit so that it will show. For opaque signs drive means such as shown in U.S. Pat. No. 2,022,105, for example, can be used, but such would be quite unsightly, or would cast undesirable shadows, in a flat, relatively thin translucent internally lighted double faced sign structure of large area. Shadows cast by all the prior art drive mechanisms of which applicant is aware, if the drive were located inside, would make such quite unsuitable for applicant's purposes.

Since, for large signs, both the mounting or supporting structure and the drive mechanism itself must be of very sturdy construction to withstand the forces of high winds and heavy storms, various heavy but external drive mechanisms have been proposed for large signs as shown, for example, in U.S. Pat. Nos. 2,556,472; 2,939,330; 2,941,322; 3,144,133, and others. None of these, however, is satisfactory for applicant's purposes.

In prior art devices, as shown in U.S. Pat. Nos. 2,556,472; 3,144,133 and others mentioned above, certain useful combinations of drive and mounting elements are shown, some of which can be employed in the present invention if desired. In the structure shown in Pat. No. 2,556,472, for example, the drive mechanism comprises an electric motor, a worm gear speed reduction mechanism and electric wiring and current transmission means which are suitable for the electric lighting of the sign as well as for the motor drive. This includes slip rings, brushes, and other elements. It also requires, however, a rather large and bulky housing which is not compatible with the preferred single column internally lighted sign structures in wide use in the United States and other countries. The prior art design of the drive mechanism has dictated that it be placed below or outside the sign proper and not inside of it. This type of mechanism has several very desirable features, such as drive connections which will yield on application of unusually high torque, as in a severe wind storm, for example. Such features are useful in the present case. Such means or equivalent are often considered necessary to prevent the placing of excess loads on the sign or on its mounting as well as on its drive mechanism per se.

SUMMARY OF INVENTION

The present invention relates to an improved display sign equipped with middle plane lighting and an internal invisible drive unit therefor, particularly a compact but rugged drive unit which can be installed inside a translucent or illuminated sign in the lighting plane and in such a way as to avoid casting shadows. The invention is of particular application to rotating signs which revolve about a vertical axis but it can be applied also to other signs which move in various ways or rotate about other axes, for example, oscillating about a vertical axis, rotating about a horizontal axis, etc.

PREFERRED EMBODIMENT

Figure 1:
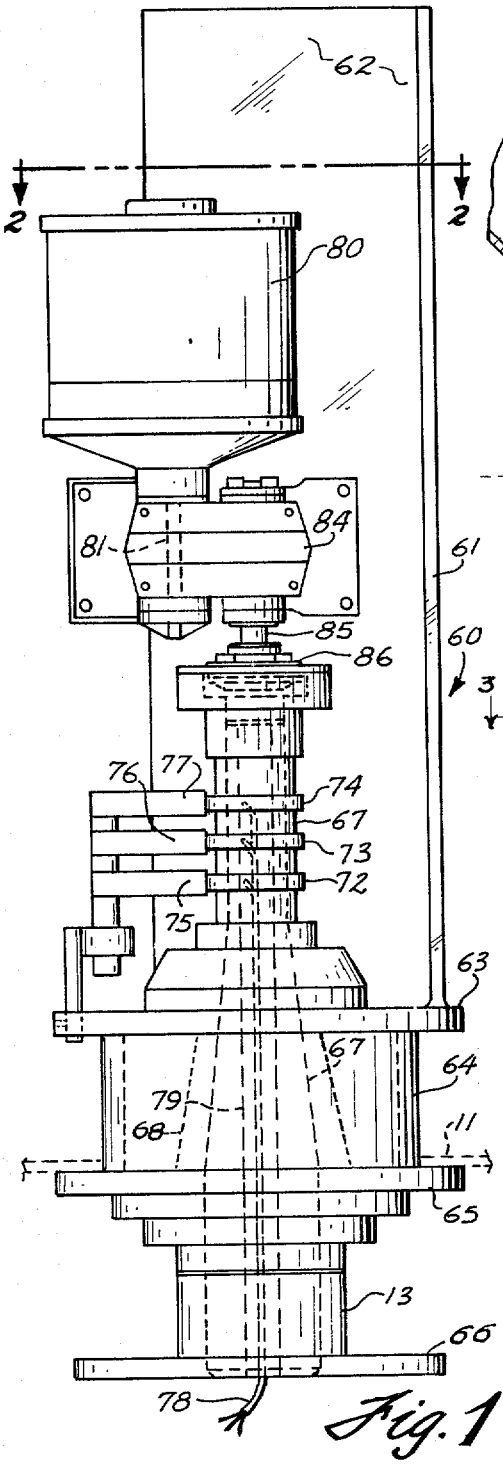
FIG. 1 shows a vertical elevation of a preferred drive mechanism and mounting therefor according to the present invention.

According to the present invention the preferred drive means incorporates in a very simple and compact manner all the advantages of the prior art structures mentioned, while it has also the singular advantage that it can be installed not only entirely within the confines of the sign but also between the adjacent lighting elements of otherwise conventional translucent mobile commercial signs. The drive mechanism of this invention, in brief is mountable in the form of a relatively slender column or unit inside a rotatable translucent sign lighted with a group of lighting elements arranged substantially in a single plane lying along the middle of a relatively thin structure in a manner such that no appreciable shadow is cast. In this way the drive mechanism is effectively hidden or camouflaged, becoming essentially invisible both in daylight and when lighted.

The usual signs, to which this drive mechanism is particularly suitable, are structures of large area, relatively speaking. They are commonly made to rotate continuously in one direction about a vertical axis atop a tall supporting pole or column. They are made with translucent walls over substantially all their outer surface, illuminated internally preferably by only a single row or other planar arrangement of spaced fluorescent light tubes. These lighting tubes or elements are commonly arranged upright and parallel in a horizontal row. If desired, however, they may be arranged in a vertical array or U-shaped lighting tubes arranged side by side, nested, or one above another may be used. The individual light tubes or elements commonly extend either for substantially the full height of the sign, from bottom to top, or in multiple banks arranged in the same plane. They preferably are spaced apart at more or less regular and uniform intervals in a vertical plane located at the middle of the thickness of the sign, that is midway between its two major faces. In broad terms, the lighting elements may be said to be spaced at uniform distances although the spacing may vary somewhat from absolute uniformity. Spacing between the individual light elements preferably is more or less of the same general order of magnitude as the overall thickness of the sign. For example, a sign which may be 6 to 15 feet high, or more, and 8 to 15 feet long, or more, may be from about 8 to 20 inches thick. Such a sign commonly will be illuminated by a single aligned series of parallel fluorescent light elements arranged in the single middle plane of the sign and spaced from about 8 to 12 or up to say 18 inches apart. *In signs having dimensions and spacings of light elements within these ranges the columnar space within which the slender drive unit is mountable as described above has an overall effective diameter within the range of about 5 to 13 inches.*

The outer walls or shell structure of the sign on all sides conventionally are formed of transparent or preferably light diffusive translucent material through which the light shines but the individual lighting elements are not distinguishable per se to an outside observer. The body of the sign can be made of a single molded piece of translucent material, usually moldable plastic, or of multiple moldable elements fastened together suitably, but various other materials and structures can be used. Such signs usually bear suitable lettering, inscriptions, or pictorial data in contrasting colors and/or contrasting translucency, illuminated from within. The inscription or insignia, etc., may be arranged in variable relief or wall thickness as well as in varying color and/or opacity, compared with the background.

Obviously with such an arrangement as described above any drive mechanism of substantial size which is placed inside the sign will tend to be visible or to cast a shadow if it blocks light from any one or more closely adjacent light sources. The resulting shadow will show on the outside of the sign. It is highly desirable to avoid such shadows, whether actually making the mechanism visible from the outside or merely interfering enough to cast an objectionable dark spot. Such is a particular object of this invention.

According to the present invention, the drive mechanism is so designed and arranged in a relatively slender column or package so proportioned that it can be placed entirely between an adjacent pair of the conventional spaced elongated or tubular light elements. The latter, in a typical case, are aligned in a single row. The spacing between light elements is such, and the proportions of the drive mechanism as a whole are such, that there is no substantial shadow cast by the drive mechanism on the inner shell structure of the sign. That is, complete blocking out of any lighting element to create a dark spot by the drive means is avoided. Therefore, no substantial shadows are cast by it to show on the outside of the sign and the drive mechanism is not noticeable or visible to the ordinary observer from without. This is true whether the sign is lighted or unlighted.

It would be possible of course, to avoid the problem of shadows from the drive mechanism by using two rows or banks of lights and placing the drive mechanism between the two light planes, for example. However, this would make the sign heavier, thicker and considerably more expensive to build, to light and to support. The particular advantage of the present invention is that it can be used very satisfactorily with the lighting elements all in a central plane, e.g. using a standard single row or aligned set of illuminating fixtures.

Figure 2:
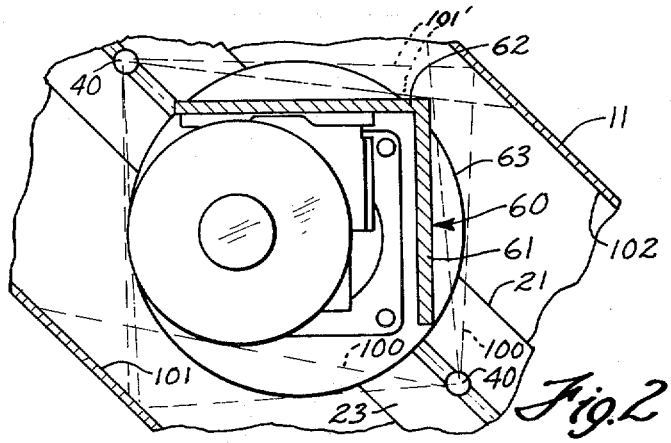
FIG. 2 shows fragmentarily an enlarged horizontal section illustrating the construction and arrangement of the drive mechanism in detail, taken substantially along line 2—2, FIG. 1.
Figure 3:
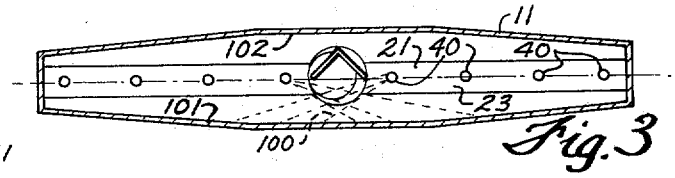
FIG. 3 is a transverse sectional view showing a sign containing the drive mechanism taken along line 3—3 of FIG. 4.
Figure 4:
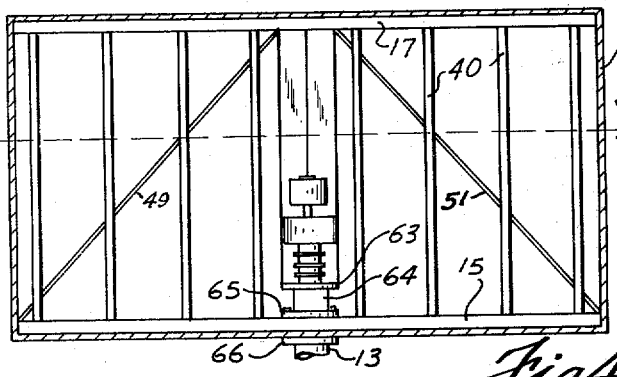
FIG. 4 is a vertical sectional view of a conventional sign showing a drive means of the present invention installed therein.

Referring now to the drawings in detail, a sign is shown in FIGS. 2, 3, and 4 which comprises a large hollow body 11 composed of any suitable translucent material. This may be a moldable plastic resin or it may be a body of glass or other translucent or transparent material. A number of suitable materials are widely available on the market. Any of those having the desired light transmitting properties and mechanical strength properties to withstand the force of wind, rain, etc., is quite satisfactory for the purpose. Such materials as acrylate or methacrylate resins ("Plexiglas"), vinyl resins and other analogous polymers, hydrocarbon polymer materials such as polyolefins, for example, polyethylene, polypropylene, etc., and appropriate copolymers of any two or more of these can be used. Glass, of course, is suitable, although it may be difficult to mold and/or too expensive to fabricate for very large signs.

The drive mechanism is so designed and oriented or mounted in the sign that it does not interfere substantially with overlapping illumination of the interior wall surfaces of the sign by separate, individual light sources which are nearby. By "nearby" it is intended to refer to those light sources which are the most [ clearly ] *closely* adjacent to a particular point to be illuminated and at least the next in series, e.g., the first and second light sources on either side of the drive mechanism. This will be explained more fully below.

The sign structure is mounted on a supporting post, usually a hollow column shown only fragmentarily at 13. The sign per se may be reinforced by structural frame elements 15, 17 attached to the post 13 or to other supporting structure, e.g. within the sign. See FIG. 5 for another example. Element 15 may be or comprise also a bearing member to support the principal weight of the sign for rotation or other movement.

The outer sign structure, i.e. the translucent shell or wall material, may be integral or it may be assembled from various parts suitably secured together and/or secured to appropriate internal structural frame or reinforcing elements, as at the corners. Such elements need not be described in detail, being well known in the art.

Referring to FIGS. 2 and 3, the sign structure per se is shown as comprising a pair of main angle bar or channel frame elements 21, 23 which support the bottom wall of the sign. Analogous structure is used in FIG. 5. Supplementing these frame elements are corner forming angle members well known in the art which are not shown in detail but which may be secured together and/or to members 21, 23, in any suitable manner. Some of these may be directly attached to the channel members 21, 23 if desired.

The elongated or tube-like lighting elements themselves, indicated at 40 in FIGS. 2, 3 and 4, have their upper and lower ends, respectively, mounted in suitable sockets or connectors of conventional and known type. The latter in turn are provided with electrical conductors and connectors, not shown in detail, by means of which power for the light is supplied. Diagonal reinforcing rods 49, 51 may be provided to strengthen the sign frame structure and to prevent sagging. Other additional or alternative reinforcing means not shown may be employed, if desired. In any case, they should be so arranged as to interfere as little as possible with uniform illumination of the shell 11. They should not cast shadows perceptible to the outside.

The supporting post 13 is preferably a hollow tube of strong structural material such as steel or other durable metal. It is of suitable size and strength to support the load of the sign and to resist the heaviest expected lateral forces from winds or storms which may strike the sign and thus apply substantial stresses thereto. In large signs this post may be from 4 to 6 or more inches in diameter.

The drive mechanism proper, because it is designed to permit overlapping internal wall illuminations by all nearby light sources and thereby obviate shadows, is the essence of the present invention. It is shown in detail in FIG. 1 and is essentially built onto a suitable structural metal member, preferably a vertically arranged angle bar 60. This structural member preferably is an angle bar having legs 61, 62 of approximately equal width and is made of suitable strong structural material, preferably steel. It partly encloses the drive mechanism per se. At its bottom end the angle bar 60 is attached to a circular flange element 63. The latter is attached to and preferably welded or integral with a collar element 64 having a lower flange 65. The sizes of the parts are such that the whole drive unit and bar 60 might be slipped inside a tubular enclosure of smaller diameter than the sign thickness. In the usual case this drive and support unit will be mounted above the supporting post 13. However, the drive unit is rotatable with respect thereto. Depending on the design of the sign, another collar 66 attached to a main fixed support shaft 67 may be used, as in FIG. 4 or as in FIG. 5. The sign structure is not directly attached to flange 66 since the latter is fixed and the sign must move. The sign body is secured to flange 65 and/or to members 60 and 63. In a large sign, the frame or support bar 60 extends only part way up the sign but it may, if desired, extend all the way from top to bottom, i.e. with both its ends attached to frame elements such as bars 21 and 23 or their equivalent.

The drive mechanism per se comprises the vertical shaft 67, preferably located along the vertical axis *of said tubular enclosure or columnar space and* of the supporting post 13, when a single post is used. Suitable bearing elements 68 surround shaft 67 which is fixed to post 13 and is not rotatable. It will thus be understood that shaft 67, as well as flange or plate 66 are immobile so that these parts are fixed to the stationary post 13 and do not rotate or otherwise move with the sign. Bearing elements 68 support the flanged plate 63 and the collar 64 and flange 65 for rotation on shaft 67.

Secured to the fixed shaft 67 are electrical conductor slip rings 72, 73 and 74. These are contacted respectively by rotating contact brush elements 75, 76 and 77. Power is supplied through suitably insulated wires 78 to the slip rings 72, 73 and 74, which are of course insulated from the shaft 67, through a hollow bore 79 inside the shaft 67. Thus the power leads may come up through the hollow supporting pipe or pole 13 and into shaft 67 to supply electric power to the slip rings. It will be understood that the wires 78 connect to a suitable source of power, preferably through the supporting pole 13.

Figure 1A:
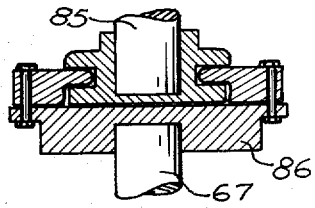
FIG. 1A is a detailed sectional view of a friction drive element.

A drive motor 80 is mounted on angle bar or support 60, with its axis parallel thereto. The motor is supplied with electric power by means of suitable connections, not shown in detail, from the brushes or sliding contacts 75, 76, 77. Through the motor output shaft 81, the motor drives the input shaft of a gear reduction mechanism 84 secured to angle bar 60. This reduction mechanism preferably is of the double ring-gear, double worm type and is a standard gear reduction mechanism well known in the trade so that it need not be described in detail. Power is taken off the gear reduction mechanism 84 through its output shaft 85, FIG. 1A. The latter is connected to a friction drive coupling 86 of known type, FIG. 1A, which will yield to allow the sign to turn under the pressure of very high winds, allowing the frictionally engaged parts to slip relatively. Thus, heavy wind forces do not damage the sign when suddenly applied. In other words the sign can overcome the normal driving friction of the clutch or connector 86 under high stress. The latter can be adjusted to control the slip point. The sign can thus align itself with strong winds, thereby preventing or at least reducing the probability of serious damage.

The lower element of the slip drive or clutch 86 is connected to shaft 67. Other slip-clutch drive means can be used if desired.

With the above arrangement it will be understood that the drive mechanism itself and bar 60 rotate with the sign about the fixed shaft 67 *and that the axis of shaft 67 is the axis of rotation of the sign.*

The arrangement of the drive elements all along and partly within the frame or channel bar 60 is a compact one. The drive mechanism elements are more or less axially aligned one above another as much as possible, so as to fit the whole drive assembly into a small compact vertical columnar configuration *symmetrical about the axis of the shaft 67 and* of relatively small overall diameter. The drive and its support are several times as long as their overall effective diameter but the parts are so proportioned and arranged that all the essential drive elements can be incorporated in the compact slender columnar space without sacrificing appropriate strength and size or exceeding the desired maximum effective diameter.

This effective diameter, or transverse dimension, of the columnar space as indicated in FIG. 2, is enough less than the normal spacing between adjacent or contiguous pairs of lighting elements 40, as shown best in FIGS. 2 and 3, that the rays of light 100 from the nearest light elements 40 overlap as they strike the inner wall surfaces 101, 102 of the sign proper. The result is that the drive structure, FIG. 2, and all its contents, i.e. motor, gear reduction means, etc., can be installed between any pair of vertical elongated light sources without substantial interference with uniform illumination of the internal wall surfaces of the sign. Hence the whole drive mechanism and its support cast a minimum of shadow, and that only faintly and obliquely, from the more remote light sources and none from the nearest adjacent lights, as shown in the ray lines 100 and 101', FIGS. 2 and 3. The radiation from the light elements 40, as a whole, overlaps quite completely and reasonably uniformly, striking the inner surfaces of the sign walls 101 and 102 in such a manner that the total light they receive appears substantially uniform to the typical observer outside. It is to be emphasized that all parts of the inner walls 101 and 102 which are near enough to any of the spaced sources of illumination to be appreciably affected receive overlapping illumination from the near or adjacent and most effective lighting elements. In addition, all areas receive some additional light directly and by reflection, which is overlapping although increasingly oblique in angle and more distant, hence less intense. When all the elements of illumination are added up, there is not enough loss in internal illumination in any given area to cast a substantial or objectionable shadow due to the internal drive mechanism. The entire inside wall areas are illuminated with sufficient intensity and uniformity from all lighting elements which are reasonably near to any give particular point so that no perceptible shadow will be cast.

Figure 5:
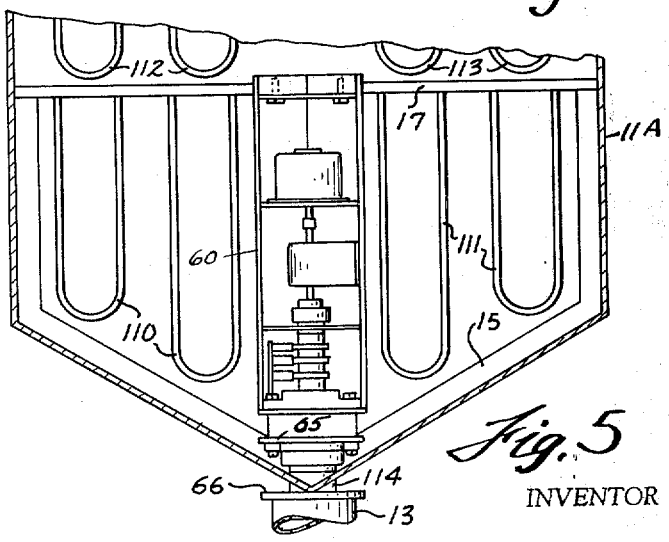
FIG. 5 is a vertical sectional view of another modification.

The arrangement shown in FIG. 5 is different only in the shape of the sign shell and in the use of U-shaped fluorescent light elements 110 and 111 in a lower bank and elements 112, 113 in an upper bank. The support unit 60 for the drive mechanism is essentially the same as in the figures previously described. The sign shell 11A is attached to the rotatable flanged support means 65 and, also, through member 17 at the upper end of element 60. The wiring is appropriate, of course, to connect the sockets which receive the ends of the lighting elements 110, 111, etc., as will be obvious.

It will be obvious also that various modifications may be made in the sign structure and in the drive mechanism and its support or general arrangement. The important point is that it is possible by this invention to arrange the drive mechanism within the confines of a slender vertical columnar space or volume, substantially smaller in diameter than either the width of the sign or the normal spacing between adjacent parallel lighting elements. This permits effective and adequate overlapping of illumination from the lighting elements which are near enough to any given point on the inside wall surface to contribute significantly to illumination, of the sign. In this way, lighting units can be located near enough together to give the effect of substantially continuous illumination of the sign walls and still permit installation of the drive unit, which hitherto has not been feasible.

While the sign arrangement has been described as involving elongated vertical single or U-shaped lighting elements, and as being rotatable in a horizontal plane, with a vertical drive arrangement, etc., it will be obvious that the whole unit can be, in effect, turned on its side, if desired, so that the lighting elements extend horizontally, the columnar drive mechanism extends horizontally, and the sign rotates in a vertical plane. Other orientation arrangements also may be made, if desired, as will be obvious to those skilled in the art. Moreover, the sign need not be rotated continuously. It can be vibrated, or rotated intermittently, in the same or in alternate directions, etc., as desired.

The support bar 60 affords an economical and adequately rigid support structure which may extend all the way from the top to the bottom of the sign. Alternatively, unit 60 can be attached by suitable means to intermediate sign structural parts. Connections to support the sign on the drive unit are made preferably to main frame channel elements such as bars 21 and 23 but they may be made in other ways if desired. Preferably the sign is rigidly supported at its bottom and at least at one higher point by use of bar 60. Any suitable means such as bolting or welding can be used to secure the bar 60 to the sign housing or internal framework.

It will be also understood that various other and additional modifications and variations in structure and arrangement may be made by those skilled in the art and still be within the spirit of the invention. It is intended to cover such modifications and variations as broadly as the state of the prior art properly permits.

What is claimed is:

1. In a large movable internally illuminated sign having translucent side walls of large area spaced apart a given distance, said sign being mountable on a tall support pole and having a series of spaced elongated light source elements arranged substantially in a row or plane between the side walls and close enough together to furnish overlapping illumination to illuminate with substantial equality the entire inner areas of said side walls, the improvement which comprises a rigid support member and a drive mechanism supported by said support member for moving said sign, said mechanism occupying only a slender columnar space of substantially smaller overall transverse dimension than either the distance between said spaced side walls or the spacing between a pair of contiguous light source elements, said mechanism including a drive motor within said columnar space and adapted to be positioned between a pair of contiguous light source elements, a gear reduction device located entirely within said columnar space and commutator means also in this said columnar space for supplying electrical energy to said motor and to said light sources, the arrangement being such that with the drive mechanism mounted inside the sign all parts of said interior wall surfaces receive substantial overlapping illumination from a plurality of the nearest ones of said light source elements, whereby the drive mechanism is mountable within the internal illuminated area of the sign without casting substantial shadows.

2. Apparatus according to claim 1 wherein the drive mechanism includes an elongated structural member secured to a rotatable flange, and wherein the drive motor is secured to said member with its shaft parallel to the longer direction of the member.

3. Apparatus according to claim 1 wherein the rigid support member is an angle bar extending from the bottom to a substantial height inside of said sign, and wherein the drive mechanism is secured to said bar, said drive mechanism including an electric motor with its drive shaft parallel to said bar and wherein the output shaft of the speed reduction gear device is parallel to the axis of said motor.

*4. A large movable internally illuminated sign having translucent side walls of large area spaced apart a given distance within the range of about 8 to 20 inches, said sign being mountable on a tall support pole and having a series of elongated light source elements arranged substantially in a row or plane between the side walls spaced about 8 to 18 inches apart and close enough together to furnish overlapping illumination to illuminate with substantial equality the entire inner areas of said side walls, a drive means which comprises a rigid support member and a drive mechanism supported by said support member installed in said sign to revolve it, said mechanism including a drive motor, a gear reduction device and commutator for supplying electrical energy to said motor and to said light source elements, said mechanism occupying only a slender columnar space of substantially smaller overall transverse dimension than either the distance between said spaced side walls or the spacing between a pair of contiguous light source elements of such a sign, the arrangement being such that all parts of the interior wall surfaces receive substantial overlapping illumination from a plurality of the nearest ones of said light source elements, whereby the drive mechanism mounted within the internal illuminated area of such a sign does not cast substantial shadows.*

*5. The combination which comprises:*

*a. a sign having:*

*1. translucent side walls about 6 to 15 feet high and about 8 to 15 feet long spaced apart a distance of about 8 to 20 inches,*

*2. a structural frame for said sign between said side walls, and*

*3. a single aligned series of parallel fluorescent light elements arranged vertically in a single middle plane of the sign spaced from about 8 to 18 inches apart; and*

*b. a drive mechanism mounted centrally in said sign between said side walls and two adjacent light elements comprising:*

*1. a support member secured to said structural frame,*

*2. a drive motor supported by said support member,*

*3. a speed reduction device connected to said motor,*

*4. commutator means for supplying electric current from a source outside said sign to said motor and light elements,*

*said drive mechanism occupying only a slender columnar space of substantially smaller overall transverse dimension than the distance between the side walls of said large sign and said adjacent parallel light elements, said series of light elements furnishing, when lighted, overlapping illumination to illuminate with substantial equality the entire inner area of said side walls, whereby said drive mechanism does not cast substantial shadows.*

*6. A drive unit and sign combination, said drive unit comprising a rigid support member and a drive mechanism supported by said support member, said mechanism occupying only a slender columnar space having an effective overall diameter of about 5 to 13 inches and including a drive motor within said columnar space, a speed reduction device located entirely within said columnar space, and commutator means also within said columnar space for supplying electrical energy from an external source to said motor, said drive unit being mounted in a large movable internally illuminated sign having translucent side walls spaced apart a given distance within the range of about 8 to 18 inches, a series of spaced, elongated light source elements arranged substantially in a row in a plane between the side walls and spaced about 8 to 18 inches apart to furnish overlapping illumination to illuminate with substantial equality the entire inner areas of said side walls, said slender columnar space being of substantially smaller overall transverse dimensions than either the distance between said spaced side walls or the spacing between a pair of contiguous light source elements so that all parts ot the interior wall surfaces thereof receive substantial overlapping illumination from a plurality of the nearest ones of said light source elements whereby the drive unit mounted within the internal illuminated area of the sign does not cast substantial shadows.*

* * * * *